United States Patent Office 2,813,567
Patented Nov. 19, 1957

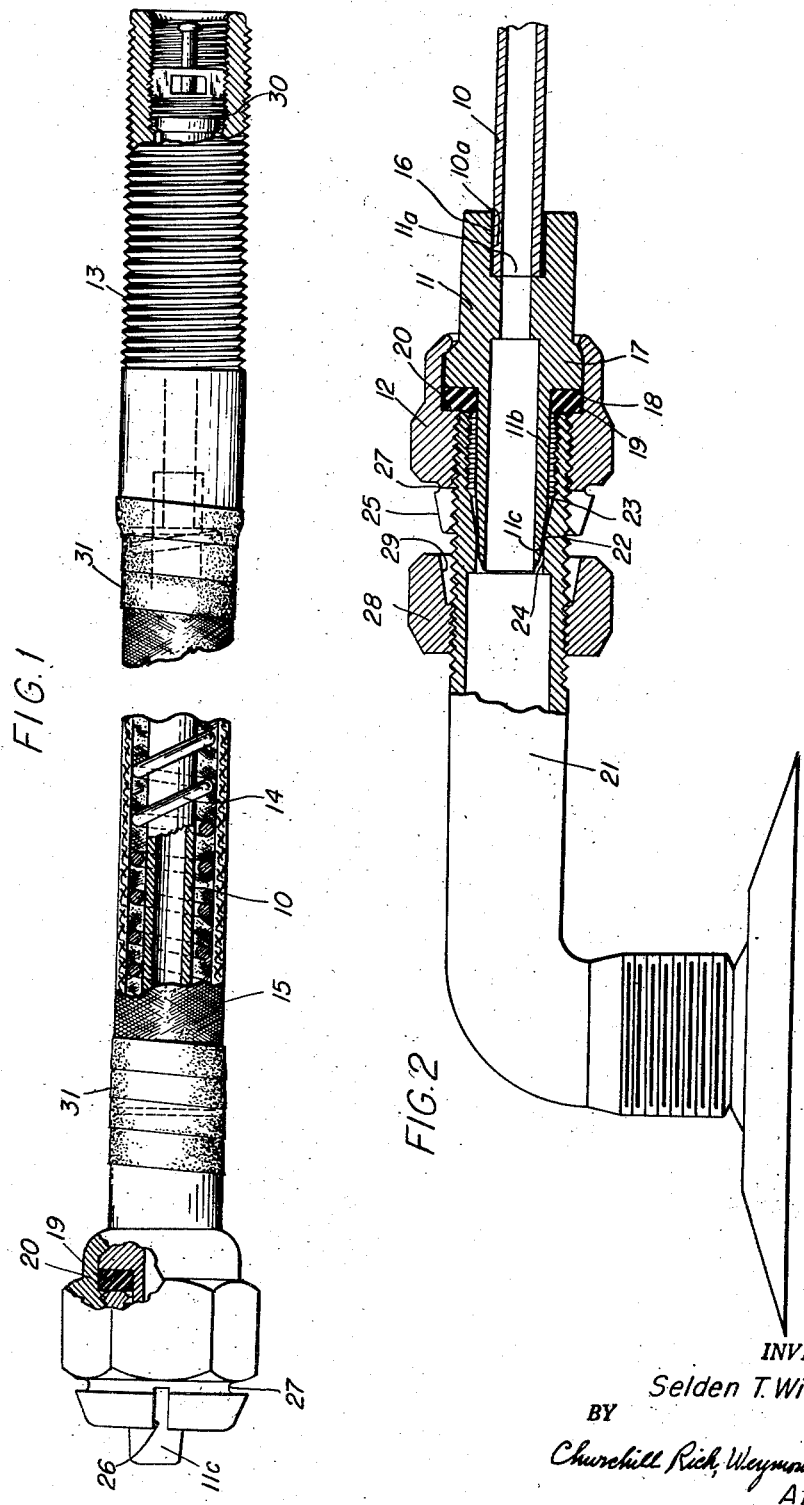

2,813,567

BENDABLE VALVE STEM EXTENSION

Selden T. Williams, Bellerose, N. Y., assignor to Scovill Manufacturing Company, Waterbury, Conn., a corporation of Connecticut Application August 28, 1953, Serial No. 377,056

3 Claims. (Cl. 152—415)

My present invention relates to a tire valve extension unit and aims to provide certain improvements therein.

Tire valve extensions are used to facilitate air service where the wheel, rim, brake and other mounting conditions prevent ready access to the valve. They extend the tire valve mouth to the desired position for inflation, gauging and deflating operations. Tire valve extensions are of two basic types, namely, (a) rigid extensions which are either straight or bent; and (b) flexible extensions which may be bent by hand into desired shape. These extensions, as made and used prior to the present invention, did not contain an air sealing valve core and depended upon a special plunger pin which extended to the outer end of the extension for depressing and unseating the tire valve core which was retained in the tire valve stem to which the extension was connected.

Under certain conditions, for example, where flexible valve extensions were used on the inner of dual wheels of trailers used to haul loads up to 50 tons over rough terrain, because of the considerable amount of vibration at the coupling joint between the extension and the valve stem, the extension would work loose and occasionally become disconnected. Also, because of the excessive heat, the rubber plug of the valve core would soften and flow and give rise to air leakage from the tire. To remedy said defects when they occurred, required the expenditure of considerable time and effort, which meant time out of service for the trailer with the resultant monetary loss to the operator.

Accordingly, it is an object of the present invention to provide a tire valve extension which will obviate the shortcomings of prior devices. A further object is to provide a hand-bendable valve extension which will facilitate air service for a tire mounted on the inner wheel of a dual wheel assembly. Still further objects are to provide a rugged, leak-tight connection between a tire valve extension and a tire valve stem, which will eliminate leaks and which will protect the air line to the tire against excessive wear and abrasion.

The foregoing and other objects of the invention not specifically enumerated I accomplish by forming a tire valve extension which is preferably hand-bendable, and comprises a strong metal tube protected by a helical spring-spaced, rugged covering of insulating loom, the extension having at one end a novel fitting formed with a hollow needle and coupling assembly by means of which a rigid, leak-tight connection can be readily provided with a tire valve casing, from which the tire valve core has been removed, and at its other having a member provided with a readily accessible valve core. The invention and the advantages resulting therefrom will be better understood from the detailed description which follows, when considered in connection with the accompanying drawings, wherein:

Figure 1 shows an elevational view of the valve stem extension assembly embodying my invention, parts thereof being broken away to better illustrate the construction thereof.

Fig. 2 shows the manner of connecting the valve stem extension assembly to a valve stem, the coupling joint at said connection being shown in section.

Referring to the drawings, the valve stem extension assembly consists essentially of the following parts: a metal tube 10 to one end of which is connected a fitting 11 provided with a coupling nut 12, and at its other end is connected to an extension stem 13, the metal tube 10 between the fitting 11 and extension stem 13 being encircled by a helical coil-spring 14 which, in turn, is enclosed by a length of tubular electrical insulating loom 15.

The metal tube 10 is preferably Bundy tubing which is hand-bendable, one end 10a thereof being permanently connected within a socket 11a in the fitting 11 by silver solder or the like 16 to provide a leak-tight joint and the opposite end of the tube 10 is connected in like manner to the extension tube 13.

The fitting 11 has an enlarged intermediate flange 17 providing a shoulder 18 against which seats a packing washer 19, preferably formed of Teflon, the packing washer being held onto the fitting by a shoulder 20 on the coupling nut which is swivelly mounted over the enlarged intermediate flange 17. The fitting 11 is formed with a hollow needle portion 11b having a diameter to fit within the mouth of a valve stem 21 when the valve core normally contained therein is removed and the free end of said needle is tapered, as shown at 11c, and is adapted to engage and provide a pressed fit with an annular edge 22 within the valve stem formed at the juncture of a tapered seat 23 and a cylindrical bore 24, when the coupling nut 12 is screwed home on the valve stem. Simultaneously with the making of the pressed fit between the needle portion and the valve stem bore, the packing washer 19 will form a leak-tight seal with the end of the valve stem at the open mouth thereof.

The coupling nut 12 at its end opposite to that whereat the swivel connection is made with the fitting 11 has an external surface which tapers toward the axis of the nut and said tapered end is slotted, as shown at 26, the end being formed with an annular groove 27 between the tapered, slotted portion and the nut proper to render the resulting jaws at the tapered end of the nut radially movable. For locking the coupling nut on the valve stem after being screwed home thereon, there is provided a locking nut 28 having an internally tapered surface 29 for engaging the tapered surface 25.

The extension stem 13 may be of any desired length and shape and is preferably fitted with a conventional air-sealing valve core 30.

In assembling the valve stem extension, one end of the tube 10 is first soldered to the fitting 11. The spring 14 and insulating loom 15 are then applied over the tube and are axially compressed somewhat, whereupon the opposite end of the tube 10 is soldered to the extension stem 13. The spring and the insulating loom are then permitted to expand and the ends of the loom are then preferably secured to the fitting 11 and to the extension stem 13, with several convolutions of pressure-sensitive tape 31.

When a valve stem extension assembly such as hereinbefore described is connected to the valve stem on an inner wheel of a dual wheel assembly it will be appreciated that by virtue of the rigid, leak-tight connection provided by the fitting 11 with the valve stem 21, the permanent leak-tight connections between the metal tube 10 and the fitting 11 and extension stem 13, and the presence of a valve core within said extension 13 that a trouble-free air service connection will be provided for such valve stem. Furthermore, by virtue of the insulating loom around the metal tube 10 and spaced therefrom by the helical spring 14, all danger of chafing or damaging of the extension tube will be eliminated. Also, by virtue of the hand-bendable characteristic of the metal tube 10 and of the insulating loom 15, the valve stem extension assembly may be suitably hand-bent to accommodate any configuration of the wheel felloe and facilitate the positioning of the extension stem at the outer side of the dual wheel assembly.

Although I have shown and described a preferred embodiment of my invention, it is to be understood that changes in details of the construction thereof may be made within the range of mechanical skill without departing from the spirit of the invention as hereinafter claimed.

What I claim is:

1. In a valve stem extension for connection with a conventional external threaded tire valve stem from the mouth of which the valve core has been removed and which valve stem has an internal tapered shoulder for accommodating the tapered plug of a valve core and a cylindrical bore portion leading from the smaller end of the tapered shoulder; said valve stem extension including a hand-bendable and settable metal tube to one end of which is connected by a permanent fluid-tight joint a coupling assembly comprising a fitting formed with a hollow metal needle, an internal threaded coupling nut swivelly mounted on said fitting and adapted to detachably secure said fitting to the tire valve stem, and a heat-resistant packing washer supported between a shoulder on the fitting and a shoulder on the coupling nut, said washer being adapted to seat on the mouth end of the valve stem, the needle portion extending through the packing washer and being formed with a free end which is externally tapered toward the axis of the needle, with the degree of taper on the needle less than that of the tapered shoulder in the valve stem and with the small end of the taper on the needle smaller than the bore in the valve stem leading from the small end of the tapered shoulder therein, said needle portion being of a length such that, when inserted into the mouth of the tire valve stem, the taper on the needle will provide a pressed fit with an annular edge in the valve stem provided at the juncture of the tapered shoulder with the cylindrical bore portion when the swiveled coupling nut is screwed home on the external thread of the valve stem and the packing washer in said fitting tightly seats on the mouth end of the valve stem.

2. A valve stem extension according to claim 1, wherein said coupling nut at its end adjacent to the tapered end of the needle portion is longitudinally slotted and has its external face tapered inwardly, and a lock nut for engaging the external threads on the valve stem and having an internal tapered face for cooperative locking engagement with the slotted tapered portion on the coupling nut.

3. In a tire valve stem extension, a metal tube which is hand bendable and settable though essentially rigid, a fitting connected by a permanent fluid-tight joint to one end portion of the tube, said fitting comprising a coupling assembly for making a rigid, fluid-tight connection with a tire valve stem from which the valve core has been removed, an extension stem connected by a permanent, rigid, fluid-tight joint to the other end portion of the tube, said extension stem having a removable valve core therein, the tube being of smaller external diameter than either the part of the fitting or the part of the stem extension to which it is connected, a helical coil-spring surrounding the tube, the ends of the spring abutting an end of the fitting and an end of the stem extension, respectively, a protective tubular covering enclosing the spring and the spring enclosed portion of the tube, and means securing the ends of the covering to said ends of the fitting and the stem extension, respectively, the tube, the spring and covering being hand bendable as a unit and adapted to be held in bent condition by the settable characteristic of the metal tube.

References Cited in the file of this patent

UNITED STATES PATENTS

| | | |
|---|---|---|
| 28,647 | Butler | June 12, 1860 |
| 536,417 | Brooks | Mar. 26, 1895 |
| 762,954 | Smith | June 21, 1904 |
| 812,299 | Schmitt | Feb. 13, 1906 |
| 935,048 | McNellis | Sept. 28, 1909 |
| 1,109,920 | Glauber | Sept. 8, 1914 |
| 1,143,816 | Duffy | June 22, 1915 |
| 1,815,002 | Beecher | July 14, 1931 |
| 1,942,468 | Andrews | Jan. 9, 1934 |
| 1,956,981 | Crowley | May 1, 1934 |
| 1,963,843 | Hartog | June 19, 1934 |
| 2,008,096 | Clo | July 16, 1935 |
| 2,150,471 | Van Vulpen | Mar. 14, 1939 |
| 2,158,576 | Glassley | May 16, 1939 |
| 2,330,864 | Bruno | Oct. 5, 1943 |
| 2,439,662 | Kidd | Apr. 13, 1948 |